US012462638B2

(12) United States Patent
Cong

(10) Patent No.: US 12,462,638 B2
(45) **Date of Patent: *Nov. 4, 2025**

(54) ELECTRONIC GAMING SYSTEMS AND METHODS

(71) Applicant: Aimin Cong, Las Vegas, NV (US)

(72) Inventor: Aimin Cong, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,413

(22) Filed: Feb. 27, 2024

(65) Prior Publication Data

US 2024/0321039 A1 Sep. 26, 2024

Related U.S. Application Data

(63) Continuation of application No. 17/534,162, filed on Nov. 23, 2021, now Pat. No. 11,915,542, which is a continuation of application No. 16/821,964, filed on Mar. 17, 2020, now Pat. No. 11,183,003, which is a continuation of application No. 15/916,279, filed on Mar. 8, 2018, now Pat. No. 10,593,147.

(60) Provisional application No. 62/468,940, filed on Mar. 8, 2017.

(51) Int. Cl.
*G07F 17/32* (2006.01)
*G07F 17/34* (2006.01)

(52) U.S. Cl.
CPC ...... *G07F 17/3213* (2013.01); *G07F 17/3218* (2013.01); *G07F 17/3223* (2013.01); *G07F 17/3225* (2013.01); *G07F 17/3244* (2013.01); *G07F 17/34* (2013.01)

(58) Field of Classification Search
None
See application file for complete search history.

(56) References Cited

U.S. PATENT DOCUMENTS 9,214,056 B2 * 12/2015 Kovacs ............... G07F 17/3216
2006/0084494 A1 * 4/2006 Belger ................ G07F 17/3265 463/20
2018/0268644 A1 * 9/2018 Cong .................. G07F 17/3213

* cited by examiner

*Primary Examiner* — Ronald Laneau
(74) *Attorney, Agent, or Firm* — Newman Law, LLC

(57) ABSTRACT

Systems and method for providing a slot-type game in which an award outcome is determined based on the amount and position of each of a randomly generated first and second symbols in the game outcome.

2 Claims, 11 Drawing Sheets

ELECTRONIC GAMING SYSTEMS AND METHODS

CROSS-REFERENCE TO RELATED APPLICATIONS

This application claims the priority benefit of U.S. Provisional Patent Application No. 62/468,940 filed Mar. 8, 2017, the disclosure of which is incorporated herein by reference.

BACKGROUND OF THE INVENTION

The invention relates generally to electronic gaming equipment, and more particularly, to an electronic gaming machines, games and special or bonus game features that may be offered to facilitate and encourage game play thereon.

Gaming machines, have become a major source of entertainment in many parts of the world. Traditionally such machines were mechanical devices where a number of reels marked with a plurality of numbers or symbols could be made to spin randomly by the application of some mechanical input. If, upon coming to a rest, the subsequent patterns of numbers or symbols displayed along a "payline" of symbol locations on the reels corresponded to predetermined patterns, then the machine would provide a prize or payout.

At one time a slot machine payline included only straight line arrangements of symbol locations across each cell in the array formed by the reels. The advent of electronics, computers and electronic graphical displays, has enabled a continual increase in the complexity and variations of gaming machines, games and displays, while maintaining the basic concept of the traditional machine. In short, the games no longer include mechanical reels but simulate rotatable reels to ultimately display a array of locations in which a symbol is displayed. These games also typically include multiple paylines many of which are not straight lines, and each cell may comprise a reel, such that every symbol in each cell is randomly selected. However, the paylines remain predefined to include specific arrangements of symbol locations in the reel array.

Bonus games that may be played in conjunction with the underlying slot game are often used to enhance the entertainment value of the game. The bonus game may comprise any type of game, either similar to or completely different from the primary game. The bonus game is typically initiated upon the occurrence of a selected event or outcome of the underlying game, but may also require an additional wager.

To keep games appealing to players there is a continuing need to develop new and interesting features and bonus games for electronic gaming. New features and bonus games appeal to player interest and enhance excitement in order to entice longer play and satisfy demands of operators for interesting games and increased profitability.

SUMMARY OF THE INVENTION

The present disclosure is directed to gaming systems and methods for providing a game in which a game outcome is reached that includes randomly determined symbols and randomly determined background features in the background of the symbols.

Some embodiments of the invention are directed to a gaming system, comprising: a housing; at least one display device supported by the housing; a plurality of input devices supported by the housing; at least one processor; and at least one memory device that stores a plurality of instructions that, when executed by the at least one processor, cause the at least one processor to operate with the at least one display device and the plurality of input devices to: (a) establish a credit balance based at least in part on a monetary value associated with a physical item after an input device receives the physical item, the physical item being a ticket associated with the monetary value or currency; (b) place a wager to initiate play of a wagering game in response to receipt of an actuation of a wager button, the credit balance being decreasable by the wager, the wagering having a preset winning criteria of at least one of a game outcome in which a first symbol wins, a game outcome in which a second symbol wins, a game outcome in which no symbol wins, a game outcome in which the first and second symbol win; (c) randomly determine and display a game outcome of an instance of play of the wagering game, wherein the game outcome includes the display of only a plurality of the first and second symbols in a depiction of virtual reels forming an array of multiple rows and multiple columns defining a plurality of cells therein; (d) determine an award outcome based on the amount and position of each of the randomly generated first and second symbols in the cells of the array of the game outcome, the credit balance being increasable by the determined award outcome; and (e) initiate a payout of the credit balance in response to receipt of a payout request.

BRIEF DESCRIPTION OF THE DRAWINGS

Other advantages of the invention will be readily appreciated as the same becomes better understood by reference to the following detailed description when considered in connection with the accompanying drawings wherein.

DETAILED DESCRIPTION OF THE INVENTION

Figure 1:
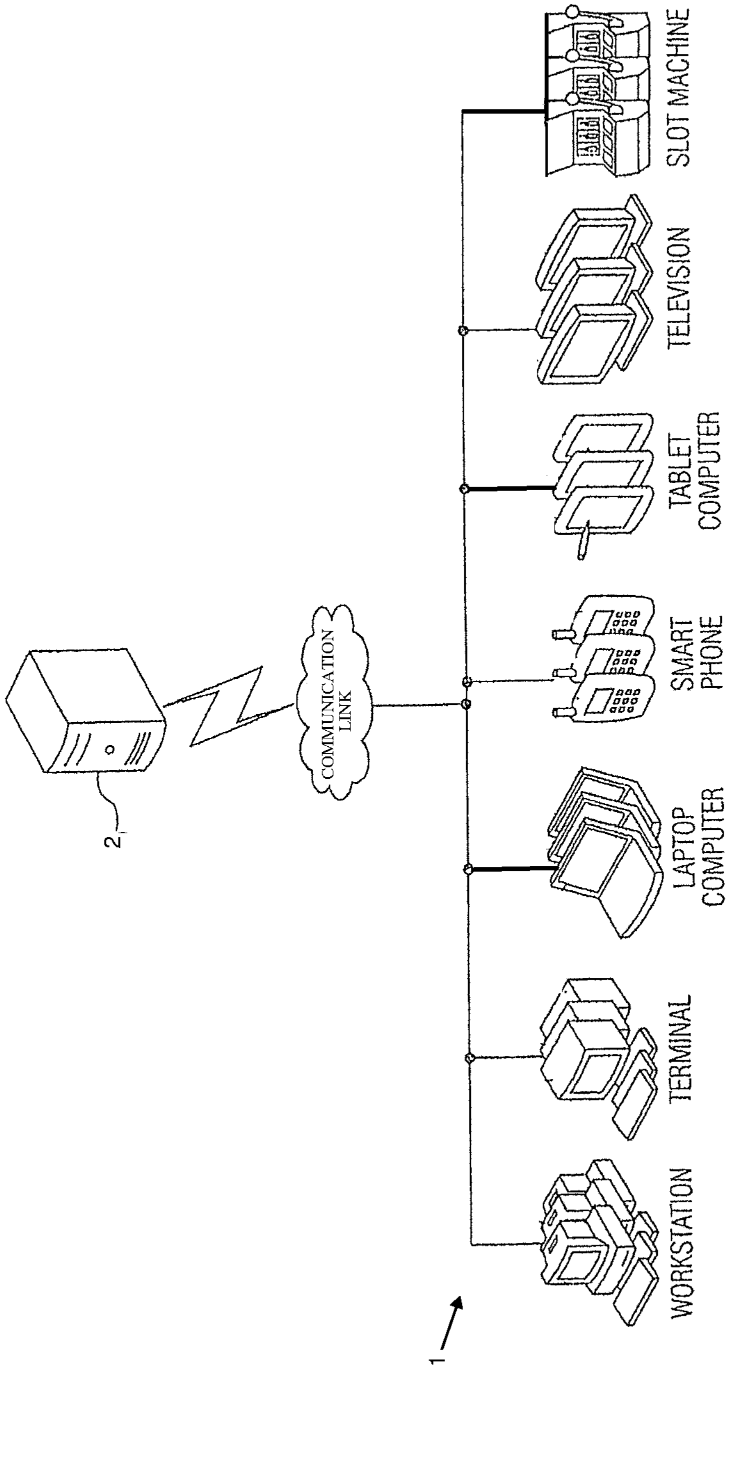
FIG. 1 is a schematic representation of various examples of gaming systems which may be used with embodiments of the invention.

The following detailed description provides systems and methods for implementing features in gaming applications. The gaming applications may be implemented in accordance or in conjunction with one or more of a variety of different types of gaming systems, such as those described herein, including computer based platforms which may be specially configured for the provision of wagering games, such as electronic gaming machines, or other devices which are not specially configured for the provision of wagering games, such as a smartphone, that can be enabled as a platform through which such wagering game features of the invention can be made accessible. Embodiments of the invention therefore contemplate a variety of different gaming systems each having one or more of a plurality of different features, attributes, or characteristics as disclosed herein.

It should nonetheless be understood that electronic gaming machines are implemented with special features and/or additional circuitry that differentiates them from general-purpose computers (e.g., desktop PC's and laptops). Gaming machines are highly regulated to ensure fairness and, in many cases, gaming machines are operable to dispense substantial monetary awards. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

Though both personal computers, or personal computing devices as the term is used herein, and gaming machines employ microprocessors that control a variety of devices, adapting technology used in personal computers to a gaming machine can be quite difficult because of reasons such as the regulatory requirements that are placed upon gaming machines, the harsh environment in which gaming machines operate, security requirements and fault tolerance requirements. Further, techniques and methods for solving a problem in the computer industry, such as device compatibility and connectivity issues, might not be adequate in the gaming environment. For instance, a fault or a weakness tolerated in a personal computer, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between personal computer systems and gaming systems will be described. A first difference between gaming machines and common personal computer based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. The requirement for a state-based system affects the software and hardware design on a gaming machine.

A second important difference between gaming machines and common personal computer based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common personal computer based computer systems is the number and kinds of peripheral devices used on a gaming machine are not as great as on personal computer based computer systems. Traditionally, in the gaming industry, gaming machines have been relatively simple in the sense that the number of peripheral devices and the number of functions the gaming machine has been limited. Further, in operation, the functionality of gaming machines are relatively constant once the gaming machine was deployed, and new peripherals devices and new gaming software are infrequently added to the gaming machine. This differs from a personal computer where users often buy different combinations of devices and software from different manufacturers and connect them to a computer to suit their needs. Therefore, the types of devices connected to a personal computer may vary greatly from user to user depending in their individual requirements and may vary significantly over time.

Although the variety of devices available for a personal computer may be greater than on a gaming machine, gaming machines still have unique device requirements that differ from a personal computer, such as device security requirements not usually addressed by personal computers. For instance, monetary devices, such as coin dispensers, bill validators and ticket printers and computing devices that are used to govern player accounts, credit and debit player account balances and handle the input and output of cash to a gaming machine have security requirements that are not typically addressed in personal computers. Therefore, many personal computer techniques and methods developed to facilitate device connectivity and device compatibility do not address the emphasis placed on security in the gaming industry.

The foregoing notwithstanding, features of the invention may be implemented on gaming machines and other devices which are not specially configured for the provision of a wagering game and make lack certain components typically included in a gaming machine. Accordingly, a gaming system as used herein refers to various configuration that may include one or more central servers, central controllers, or remote hosts, one or more electronic gaming machines and/or one or more devices which are not specially configured for the provision of a wagering game, such as desktop computers, laptop computers, tablet computers or computing devices, televisions, personal digital assistants (PDAs), mobile telephones such as smart phones, and other mobile computing devices hereinafter referred to collectively as personal computing devices.

Thus, in various embodiments, the gaming system of the present disclosure includes: one or more electronic gaming machines in combination with one or more central servers, central controllers, or remote hosts; one or more personal computing devices in combination with one or more central servers, central controllers, or remote hosts; one or more personal computing devices in combination with one or more electronic gaming machines; one or more personal computing devices, one or more electronic gaming machines, and one or more central servers, central controllers, or remote hosts in combination with one another; a single electronic gaming machine; a plurality of electronic gaming machines in combination with one another; a single personal computing device; a plurality of personal computing devices in combination with one another; a single central server, central controller, or remote host; and/or a plurality of central servers, central controllers, or remote hosts in combination with one another.

In the various embodiments, the personal computing devices and/or electronic gaming machines are configured to communicate with the central server, central controller or remote host through a communication link, such as a local or wide area data network, closed, intranet or open system or remote link such as the Internet.

FIG. 1 illustrates a schematic of exemplary gaming system hardware and network platform that can be used to implement embodiments of the invention. The system includes slot machines (that is, electronic gaming machines and plurality of personal computing devices, which are interconnected and in communication with one or more central servers 2 through one or more communication links, which may include a data networks and the internet. Exemplary personal computing devices shown in FIG. 1 include workstations, terminals (including self-service wagering terminals), laptops or other internet connected computing systems, mobile or smart phones, tablet computers and televisions. For brevity and clarity, each electronic gaming machine (slot machines, gaming machines, etc.) and personal computing device mentioned herein and any equivalents thereto is collectively referred to herein as an "EGM." Thus, the electronic gaming machines and personal computing devices shown in FIG. 1 are generally designated by the reference numeral 1. Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: an EGM configured to communicate with a central server, central controller, or remote host through a data network; and/or a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: an EGM configured to communicate with a central server, central controller, or remote host through a data network; and/or a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: in an area of a gaming establishment different from an area of the gaming establishment in which the central server, central controller, or remote host is located; or in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: an EGM configured to communicate with a central server, central controller, or remote host through a data network; and/or a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the communication link, data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs).

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM. In other embodiments, at least one of the at least one processor of the EGM and the at least one memory device of the EGM reside outside the cabinet of the EGM In certain embodiments, as generally described herein, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

In various embodiments, the EGM includes one or more input devices. The input devices may include any suitable device that enables an input signal to be produced and received by the at least one processor of the EGM. One input device of the EGM may be a payment device configured to communicate with the at least one processor of the EGM to fund the EGM or a player account which is capable of funding the EGM. In certain embodiments, the payment device includes one or more of: a bill acceptor into which paper money is inserted to fund the EGM; a ticket acceptor into which a ticket or a voucher is inserted to fund the EGM; a coin slot into which coins or tokens are inserted to fund the EGM; a reader or a validator for credit cards, debit cards, or credit slips into which a credit card, debit card, or credit slip is inserted to fund the EGM; a player identification card reader into which a player identification card is inserted to fund the EGM; through communication with a bank account or mobile device, such as a smartphone, or other account configured for transferring funds or cryptocurrency to the EGM upon authorization by a player; or any suitable combination thereof.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display.

Figure 2:
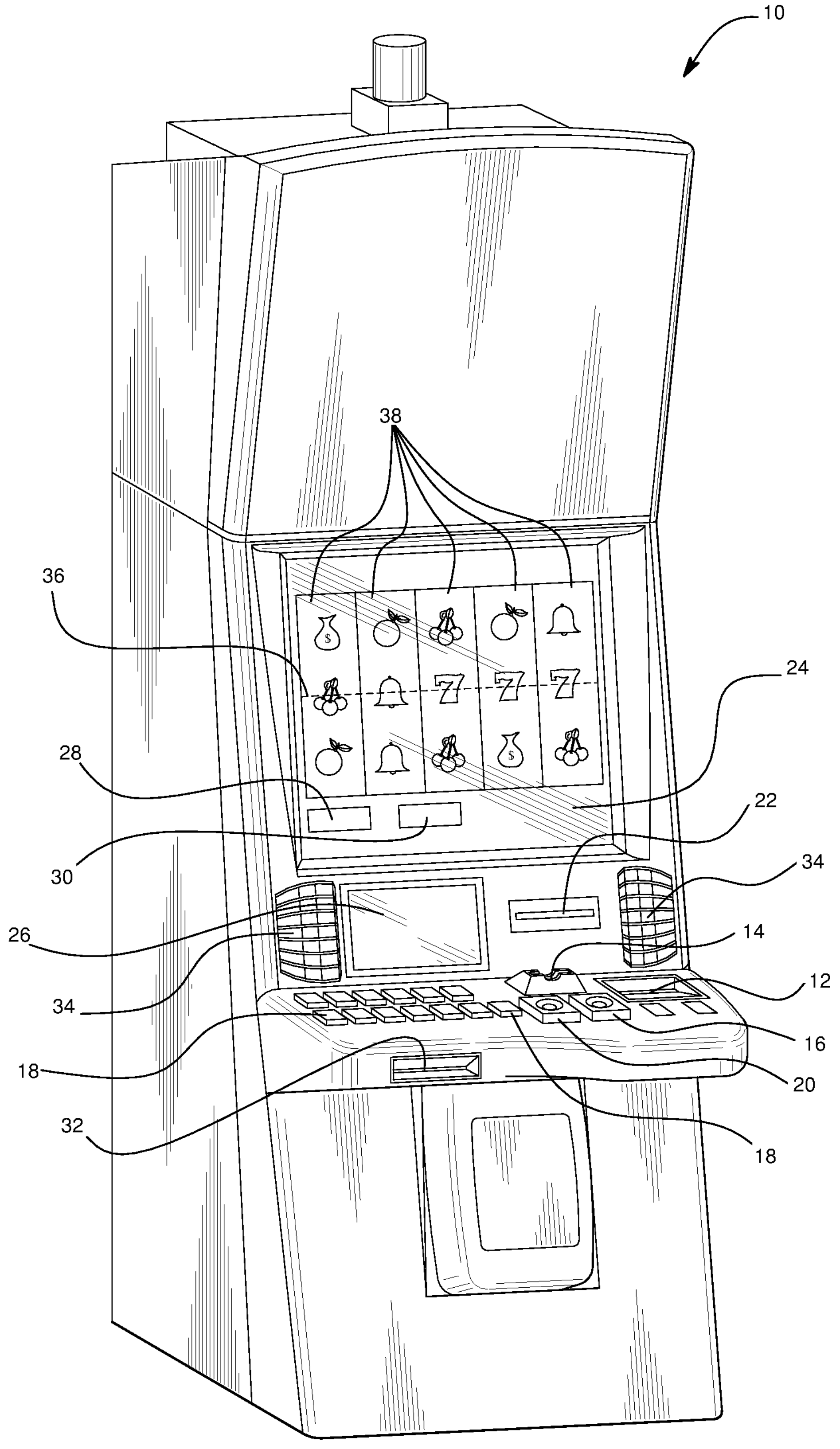
FIG. 2 is a perspective view of an exemplary embodiment of an electronic gaming machine which may be used with some embodiments of the invention.

FIG. 2 illustrates an exemplary EGM of the general type and form which may be fabricated and commercialized by any of the various gaming manufacturers generally indicated by the reference numeral 10. EGM 10 includes payment devices including a combined bill and ticket acceptor 12, and a coin slot 14.

In various embodiments, one or more input devices of the EGM are one or more game play activation devices that are each used to initiate a play of a game on the EGM or a sequence of events associated with the EGM following appropriate funding of the EGM. EGM 10 includes a game play activation device in the form of a game play initiation button 16. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display decreases by one, and a number of credits shown in a bet display increases by one. EGM 10 includes one or more input devices 18 consisting of various depressible buttons or touch sensors.

In other embodiments, one input device of the EGM is also a cash out device. The cash out device is utilized to receive a cash payment or any other suitable form of payment corresponding to a quantity of remaining credits of a credit display. EGM 10 includes a cash out device in the form of a cash out button 20.

In certain embodiments, one input device of the EGM is a touch-screen coupled to a touch-screen controller or other touch-sensitive display overlay to enable interaction with any images displayed on a display device. One such input device is a conventional touch-screen button panel. The touch-screen and the touch-screen controller are connected to a video controller. In these embodiments, signals are input to the EGM by touching the touch screen at the appropriate locations.

In embodiments including a player tracking system, one input device of the EGM is a card reader in communication with the at least one processor of the EGM. EGM 10 includes a card reader 22. The card reader is configured to read a player identification card inserted into the card reader.

In various embodiments, the EGM includes one or more output devices. One or more output devices of the EGM are one or more display devices configured to display any game(s) displayed by the EGM and any suitable information associated with such game(s). In certain embodiments, the display devices are connected to or mounted on a cabinet of the EGM. In various embodiments, the display devices serves as digital glass configured to advertise certain games or other aspects of the gaming establishment in which the EGM is located. In various embodiments, the EGM includes one or more of the following display devices: a central display device; a player tracking display configured to display various information regarding a player's player tracking status; a secondary or upper display device in addition to the central display device and the player tracking display; a credit display configured to display a current quantity of credits, amount of cash, account balance, or the equivalent; and a bet display configured to display an amount wagered for one or more plays of one or more games. EGM 10 includes a central display device 24, a player tracking display 26, a credit display 28, and a bet display 30.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: a ticket generator configured to generate and provide a ticket or credit slip representing a payout, wherein the ticket or credit slip may be redeemed via a cashier, a kiosk, or other suitable redemption system; a note generator configured to provide paper currency; a coin generator configured to provide coins or tokens in a coin payout tray; and any suitable combination thereof. EGM 10 for example includes ticket generator 32. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. EGM 10 includes a plurality of speakers 34. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as EGM 10, EGMs have a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

It should be appreciated given the definition assigned to EGMs hereunder that certain of the example EGMs described above include certain elements that may not be included in all EGMs. For example, the payment device of a personal gaming device such as a smartphone may not include a coin slot.

In various embodiments, an EGM may be implemented in one of a variety of different configurations. In various embodiments, the EGM may be implemented as one of: a dedicated EGM wherein computerized game programs executable by the EGM for controlling any primary or base games and/or any secondary or bonus games or other functions displayed by the EGM are provided with the EGM prior to delivery to a gaming establishment or prior to being provided to a player; and a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: embedding the executable game program in a device or a component (such as a microchip to be inserted into the changeable EGM); writing the executable game program onto a disc or other media; or uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: a player database for storing player profiles, a player tracking module for tracking players, and a credit system for providing automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system, each substantially equally spaced apart from one another in areas or “cells” along the respective reel strip or virtual representation thereof. In certain such embodiments, the gaming system includes one or more paylines associated with the reels. EGM 10 includes a payline 36 and a plurality of reels 38. In certain embodiments, one or more of the reels are independent reels or unisymbol reels. In such embodiments, each independent reel generates and displays one symbol per cell in the display.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game (s). It should be appreciated that the secondary game(s) may be any type of suitable game, either similar to or completely different from the primary game.

In various embodiments, the gaming system automatically provides, activates or initiates game features in the primary game or the secondary game upon the occurrence of a triggering event or the satisfaction of a preset criteria or qualifying condition. In other embodiments, the gaming system initiates the secondary game upon the occurrence of the triggering event or the satisfaction of the qualifying condition and upon receipt of an initiation input. In certain embodiments, the triggering event, preset criteria or qualifying condition is a selected outcome in the primary game(s) or a particular arrangement of one or more indicia on a display device for a play of the primary game(s), such as one or more symbols appearing on three adjacent reels along a payline following a spin of the reels for a instance of play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more game features or secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

As discussed, the present disclosure contemplates a variety of different gaming systems each having one or more of a plurality of different features, attributes, or characteristics. Exemplary embodiments herein below describe primary and/or secondary game features according to the invention. Each of such features may be combined with another, applied and utilized after each spin or game, may occur only upon or the spin immediately after a triggering event, such as players receiving a trigger symbol or upon the occurrence of another bonus or event in the underlying game, or may be available for every game in which a player wagers the maximum amount allowable in the game, that is, "maxbet," or a bonus feature may be triggered during the operation of another game or bonus feature. Any of the game or bonus features may involve or require player interaction or input, or occur automatically, either immediately along with an associated display or after a period of time has elapsed in which no player input is received, or combinations thereof. The operation of game or bonus features herein may be impacted by and a function of systems and methods configured to achieve a desired return to player ("RTP").

Figure 3:
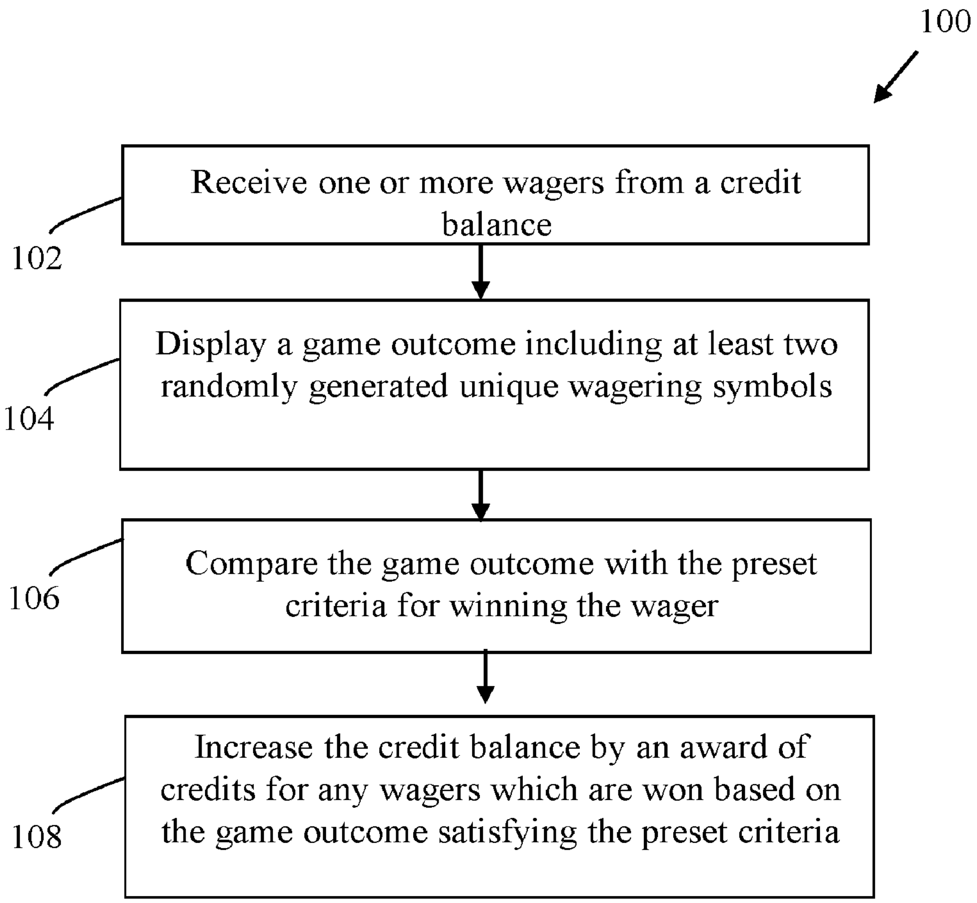
FIG. 3 is a flowchart illustrating a method of operating an exemplary embodiment of the gaming system of the invention.

FIG. 3 illustrates a flowchart of an exemplary embodiment of a process or method 100 of operating the gaming system of the invention, which may be represented by a set of instructions stored in one or more memories and executed by one or more processors which may be in communication with one or more random number generators.

In this embodiment a gaming system of the invention is configured to operate a game associated with at least two different unique symbols, if not a plurality of different symbols, wherein the at least two different unique symbols are the wagering symbols used to determine the outcome of wagers in the game. Each wager is won pursuant to satisfaction of a preset criteria and the game may be, or have the appearance of being, a conventional slot game. Assuming a credit balance has been established for use with the gaming system, such as by an input or payment device receiving funds or an item of monetary value, such as a ticket, a wager for play of the game is received in block 102. Responsive to receiving the wager, the credit balance is decreased by the amount of the wager being debited from the credit balance. The wager may be placed pursuant to actuation of a wager input signal by the player through a button or virtual representation thereof.

In some embodiments, wagers have various preset criteria for winning. For example, wagers may be received and won based on a specific wagering symbol of the at least two different wagering symbols being in the majority of the randomly generated symbols in the game outcome. A wager may be placed on each of the different wagering symbols, though in the embodiments herein only one wagering symbol may be in the majority. A wager may also be received having a preset criteria that is satisfied based on none of the wagering symbols being in the majority in the game outcome.

In some embodiments, a wager on a specific wagering symbol is won based on a comparison of each active payline in the game outcome with a preset criteria. For example, a wager on a specific wagering symbol may be won based on that wagering symbol being in the majority displayed in an active payline, or the wagering symbol being displayed in the most consecutive instances in an active payline, or the wagering symbol being displayed at least a preset amount of instances consecutively in an active payline. In some embodiments, a wager on a specific wagering symbol is won based on the number of active paylines in the game outcome which the preset criteria is satisfied for the specific wagering symbol. Similarly, a wager on none of the wagering symbols winning may be based on the comparison of one or more active paylines with the preset criteria determining no winning wagering symbol.

For example, if the payline is formed of five cells in the array, such as in a 3×5 array, then the preset amount of instances may be three. Thus each payline may be a winning payline for a single symbol of the group only, or not a winning payline for any symbol. Payouts may be based on the number of paylines in which the symbol is the winning symbol.

In some embodiments, the payouts on wagers are increased for each payline based on the amount of appearances of the symbol in the payline, so long as the appearances are greater than the preset minimum amount necessary. For example, a symbol may be a winning symbol if an active payline includes at least three instances of the symbol in consecutive order from left to right along the payline, with the payout be enhanced for each instances of the symbol above three in consecutive order. In other words, four or five of a symbol in consecutive order will result in a larger payout than three in consecutive order for any wagers placed on the symbol.

In an exemplary embodiment, the wagering symbols group consists of two symbols, symbol 1 and symbol 2. Thus players may wager on symbol 1, symbol 2, symbol 1 and symbol 2 or no winner. In this embodiments, wagers are determined by the results of each active payline. Player wagers received on neither of the symbols winning the game outcome are awarded an odds payout expressed as a multiple of the unit wagered for a "no win" game outcome.

As a result of the wager being received, the gaming system provides a game outcome which includes the at least two wagering symbols or virtual reels containing the at least two wagering symbols being randomly selected for display as the game outcome, as shown by block 104. For example, each symbol display area may comprise a cell or position in a virtual reel. Thus, in block 104, the cells or virtual reel may be populated by the at least two wagering symbols. In some embodiments, the symbols consist only of the wagering symbols. In some embodiments, there are two wagering symbols, and each cell in the display area or each reel includes either one or the other of the two wagering symbols.

As shown by blocks 106 and 108, should the game outcome satisfy any preset criteria for a winning wager then any award associated with the game outcome is credited to the credit balance thus increasing the credit balance available.

Figure 4:
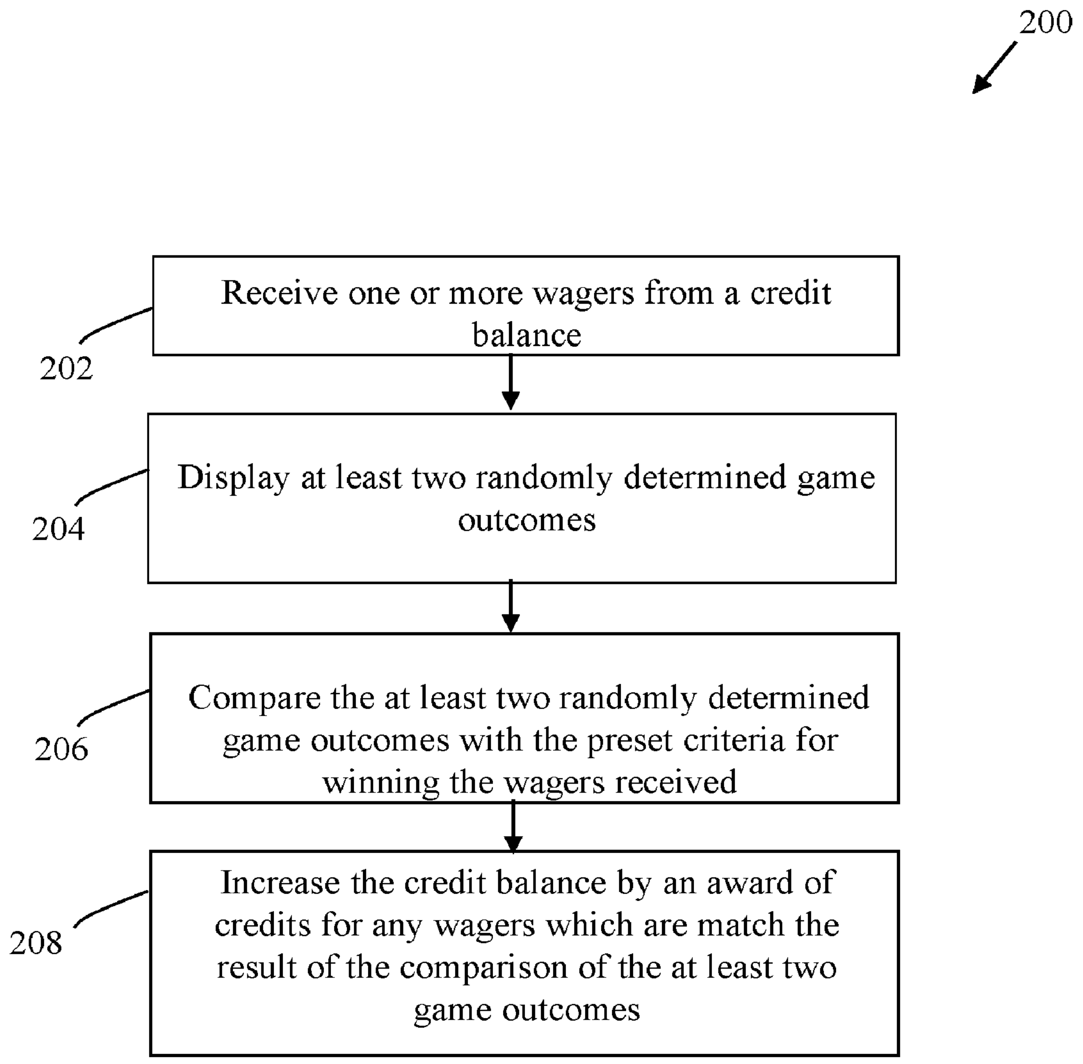
FIG. 4 is a flowchart illustrating a method of operating another exemplary embodiment of the gaming system of the invention.

As shown by FIG. 4, a process or method 200 of operating an EGM of the invention to provide a slot game having at least two sets of multiple reels defining a plurality of positions on a display in which symbols are displayed for at least two separate game outcomes. For example, each game outcome may comprise a 3×5 slot game display of two separate grids of fifteen cells or positions each for symbols to be displayed. A winning game outcome for any of the game outcomes is exhibited by a game outcome in which a payout is awarded. The determination of a winning game outcome and associated payout award for each game outcome included may be based on the amount of symbols or special symbols occurring in paylines, in any manner described in this disclosure, or may be based on conventional slot game outcome determinations, or as set forth by the embodiment described in FIG. 3 for example.

In this embodiment, wagers received in block 202 may include wagers having a preset criteria for winning such as all game outcomes win, a majority of game outcomes are winning, an equal amount of game outcomes win, no game outcomes are winning game outcomes, specific game outcomes are winning (such as by identifying the game outcome, such as 1, 2, 3, etc. up to the total amount of game outcomes displayed), no game outcome is winning, or which game outcome is results in the highest payout award.

For example, if there are two game outcomes, identified as game outcome 1 and 2, then wagers may be received having the preset criteria for winning based on both game outcomes 1 and 2 winning, both game outcomes 1 and 2 not winning, game outcome 1 winning, game outcome 1 not winning, game outcome 2 winning and game outcome 2 not winning, respectively.

As shown by block 204, the symbols may be randomly generated each position or displayed based on their position in a virtual reel randomly stopped for each of the game outcomes. As shown by blocks 206 and 208, the game outcomes are compared with the preset criteria for the wagers received in block 202 and the credit balance is increased based on the satisfaction of any of the preset criteria for the wagers received.

Although process 100 and 200 are described with reference to the flowchart shown in FIG. 3 and FIG. 4, it should be appreciated that many other processes of performing the acts associated with this illustrated process may be employed. For example, the order of certain of the illustrated blocks and/or diamonds may be changed, certain of the illustrated blocks may be optional, and/or certain of the illustrated blocks may not be employed.

Figure 5:
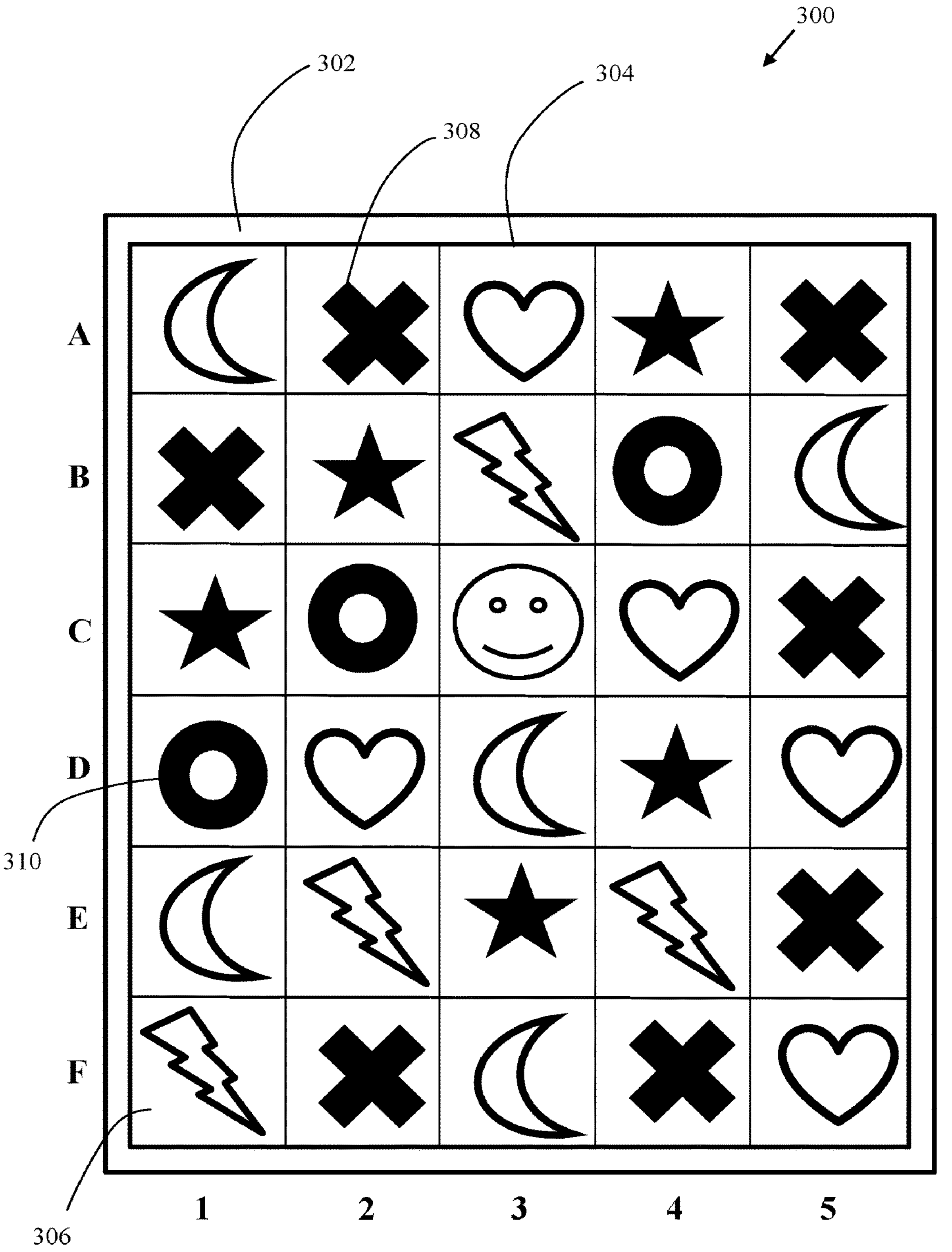
FIGS. 5-9 illustrate display screens of a gaming system constructed in accordance with some exemplary embodiments of the invention.

FIG. 5 is illustrates a game user interface 300 configured according to some embodiments of the invention for display as a screen on a display device operatively associated with an EGM. It should be understood that game user interface 300 may be configured for use on any gaming system or EGM including any shown in FIG. 1 and FIG. 2.

In this embodiment, the game display 302 displayed to players comprises an area having the appearance of multiple reels forming a grid 304 composed of rows and columns defining cells 306. In this embodiment, the wagering symbols 308 (the "X" symbol) and 310 (the "O" symbol) and a plurality of other symbols having no impact on the game outcome.

Game display 302 may further include game information in areas adjacent to grid 304 which may include credits remaining, credits won or bet and game graphics, among other things. For example, grid 304 may include wagering input buttons for wagering on symbol X winning, symbol O winning or neither symbol O or X winning. In some embodiments, the various wagers may be received in the same instance of a game.

As a result of an instance of play of game 302, grid 304 is randomly populated with symbols including wagering symbols 308 and 310 via a processor accessing a random number generator. To play game 302 a player may be required to submit credits or money through any conventional means, such as an e-wallet or other payment transfer system if playing through an online platform, or a card or money reader, such as acceptor 12, if playing through an electronic gaming machine platform. Determining an outcome for an instance of play of game 302 generally depends on the preset criteria as discussed with reference to the embodiment of the invention shown in FIG. 3, that is, based on the number of randomly generated wagering symbols 308 and 310 in grid 304, and in some embodiments, by their respective position in grid 304 and/or in connection with one or more paylines.

Figure 6:
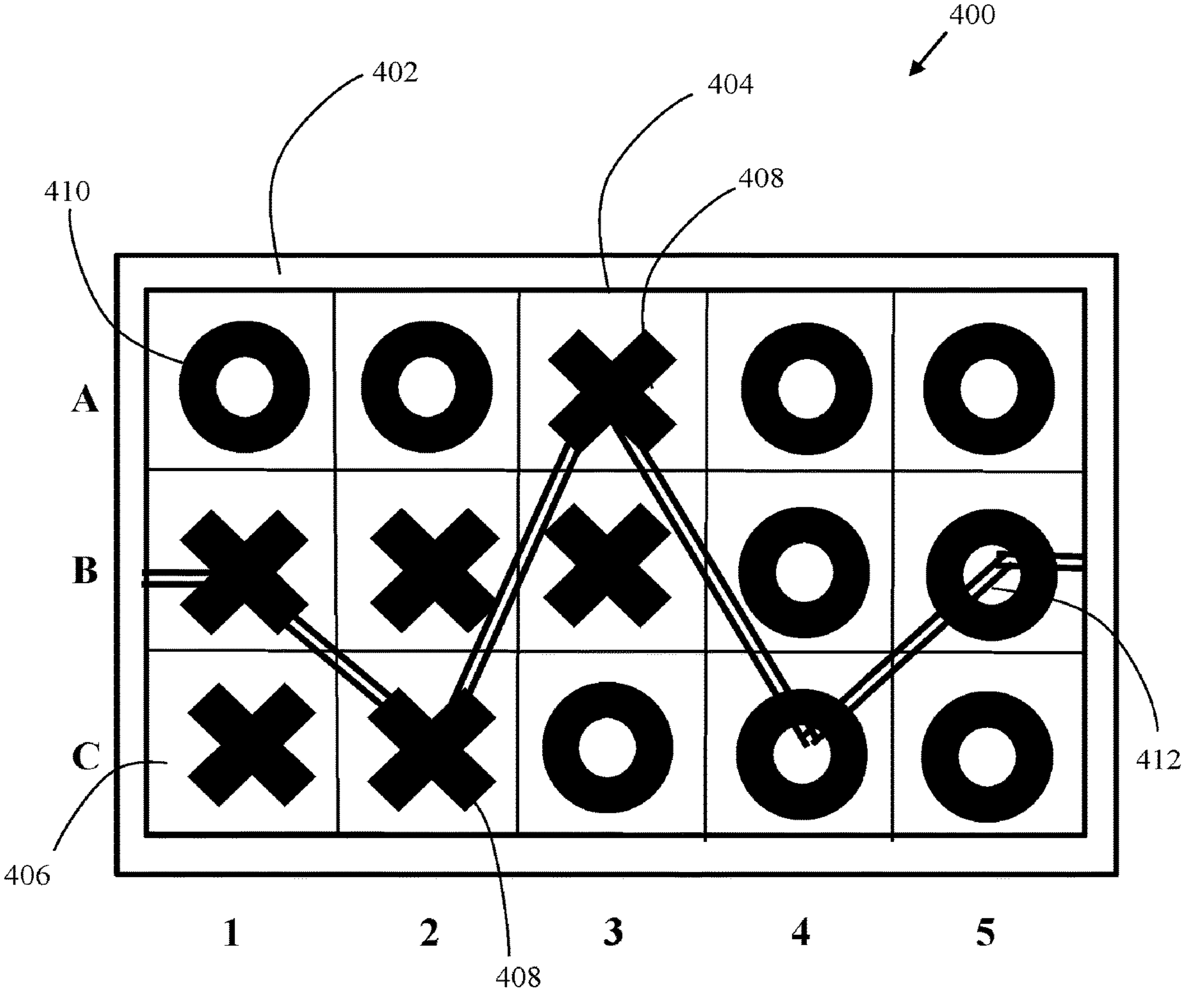

FIG. 6 illustrates another embodiment of the invention displayed in the form of a 3×5 grid 404 having only two wagering symbols 408 and 410 randomly generated and displayed in each cell 406 of grid 404.

The game as shown in interface 400 may be played and game outcome determined as discussed above with respect to FIG. 3. In this embodiment, the winning wagering symbol is determined by paylines. As shown, payline 412 (cells B1, C2, A3, C4 and B5) determines the game outcome as satisfying the preset criteria for wagering symbol 408 (the "X") winning. Any players from which wagers are received that wagering symbol 408 will win would thus receive a payout award.

Figure 7:
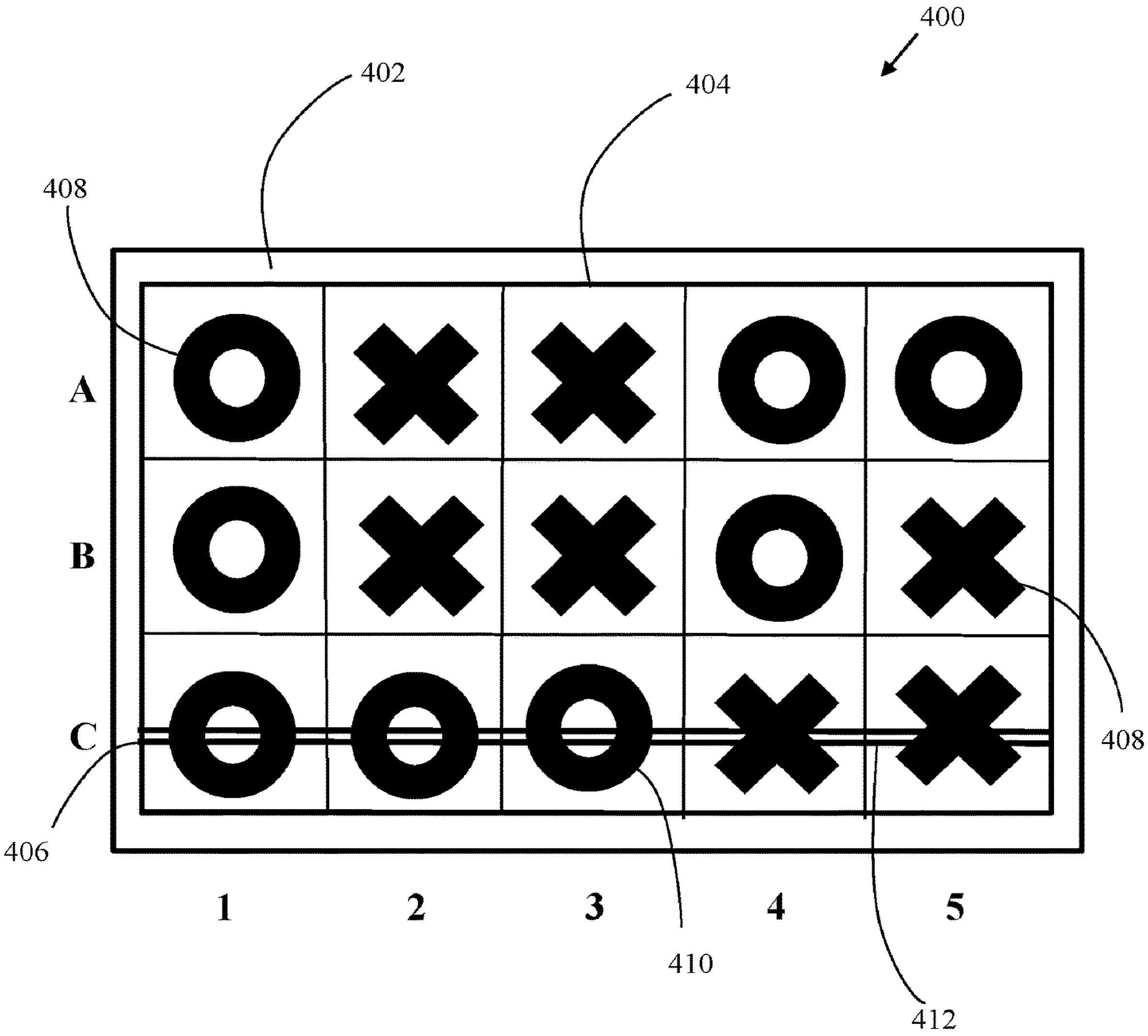

FIG. 7 illustrates payline 412 identifying symbol 410 as the winning symbol. Thus, any wagers having the preset criteria that wagering symbol 410 is the winning symbol would be won and payout awards would be distributed accordingly.

Figure 8:
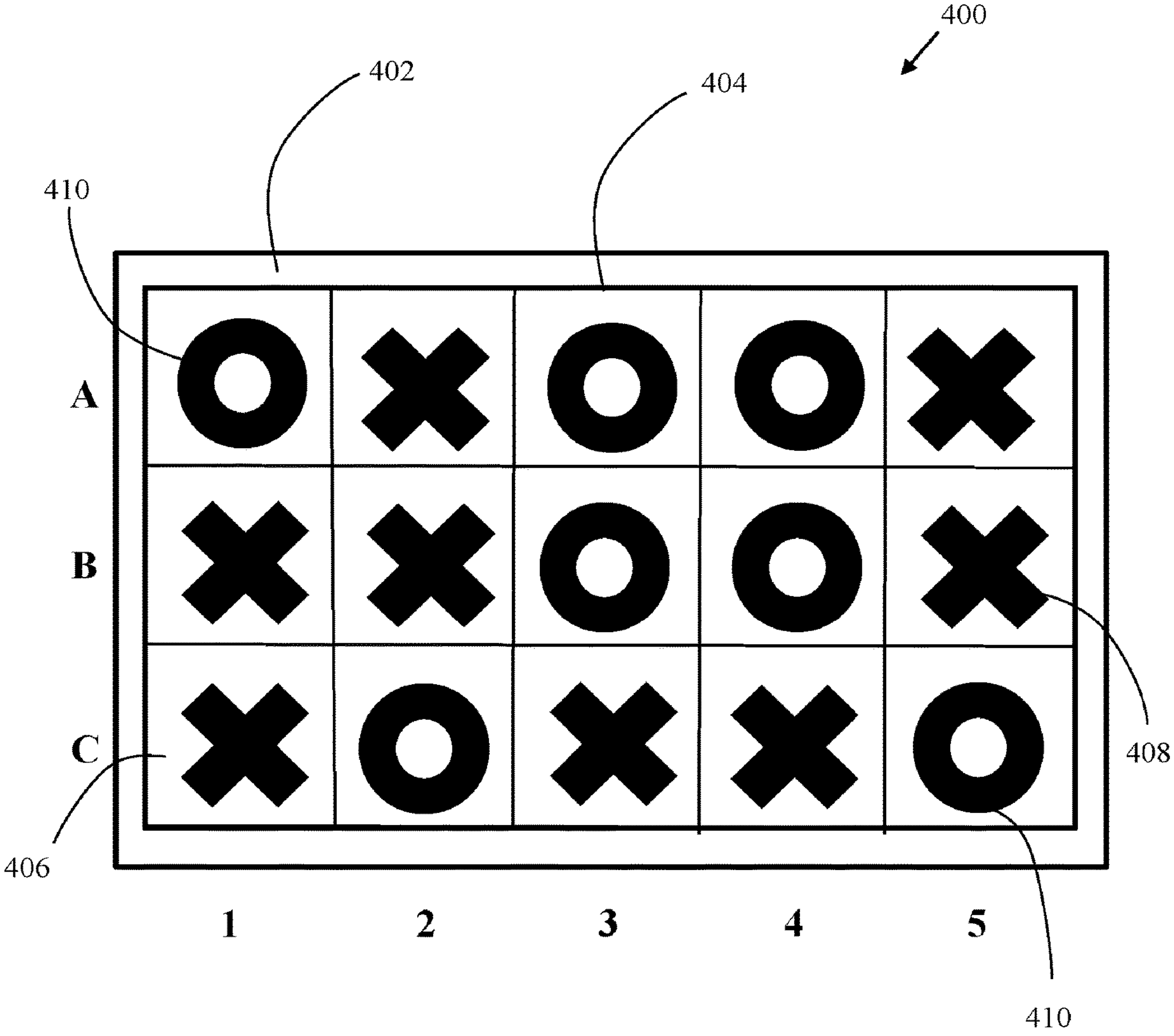

FIG. 8 illustrates neither symbol 408 or 410 as being the winning symbol. Thus, any wagers having the preset criteria that no wagering symbol would winning in the game outcome, that is, a non-winning or "no win" game outcome, would be won and payout awards would be distributed accordingly.

Figure 9:
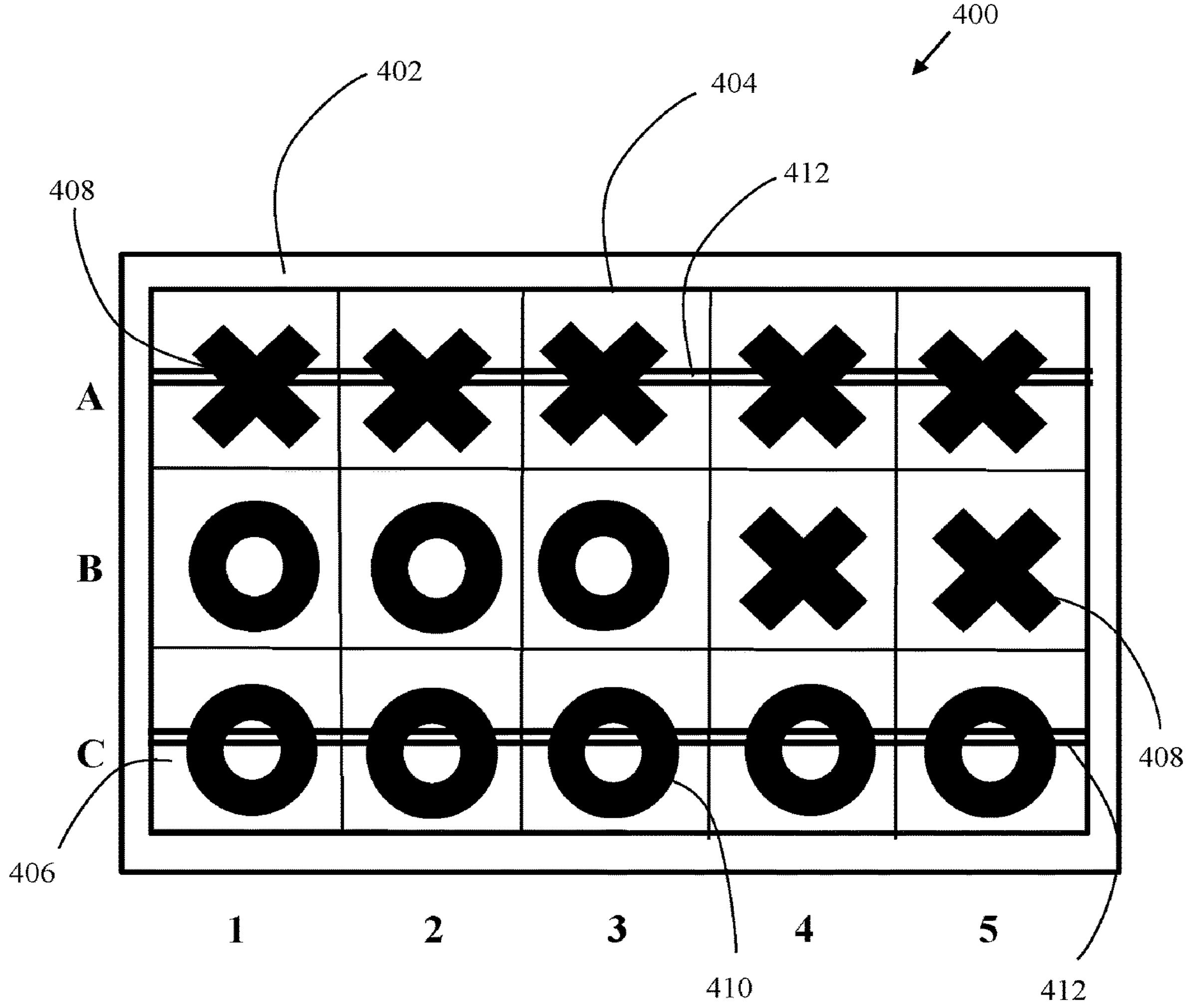

FIG. 9 illustrates two paylines 412 identifying both symbols 408 and 410 as the winning symbols. Thus, any wagers having the preset criteria that both wagering symbols 408 and 410 would both be winning symbols would be won and payout awards would be distributed accordingly.

Figure 10:
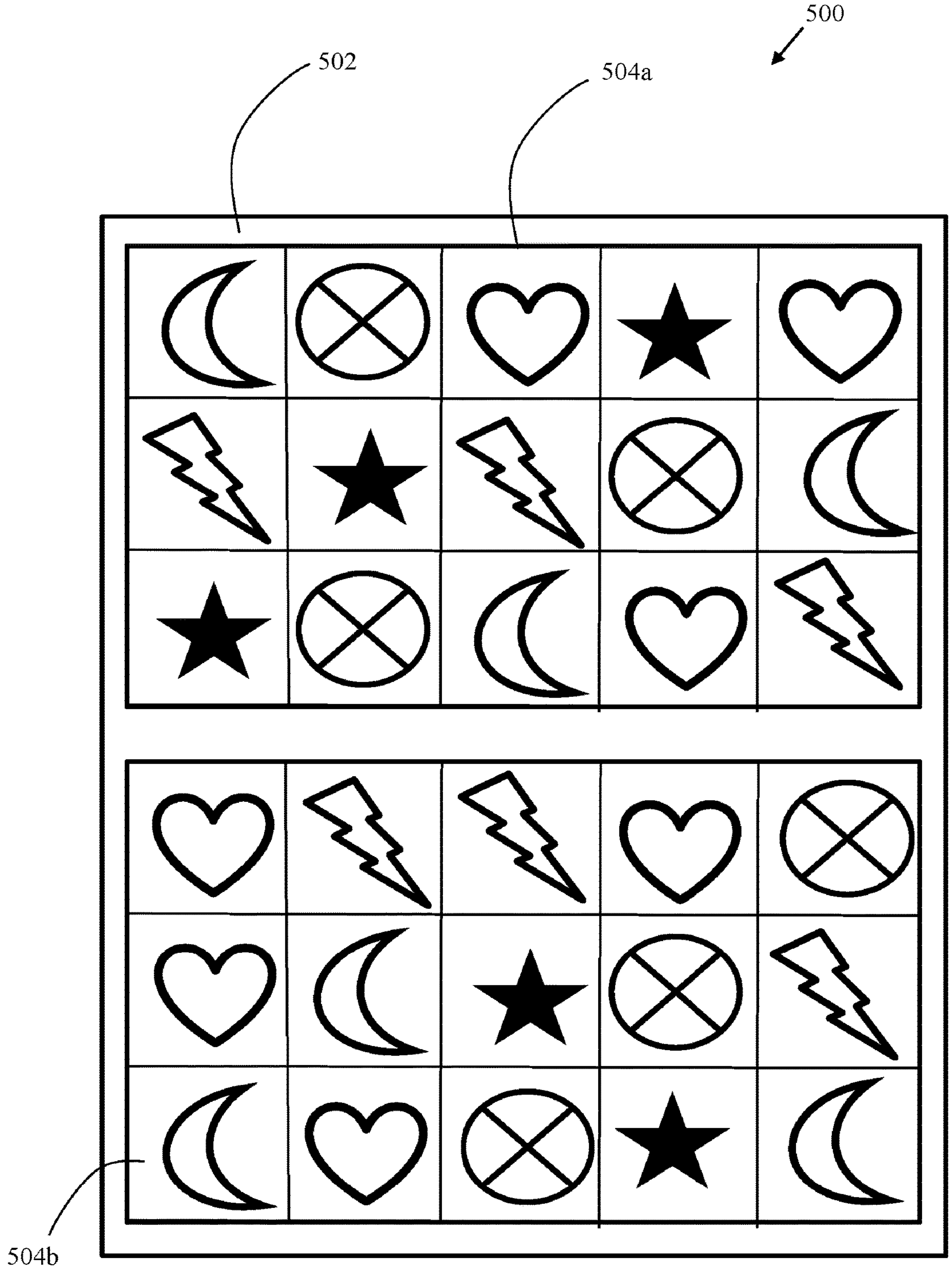
FIGS. 10-11 illustrate display screens of a gaming system constructed in accordance with some other exemplary embodiments of the invention.
Figure 11:
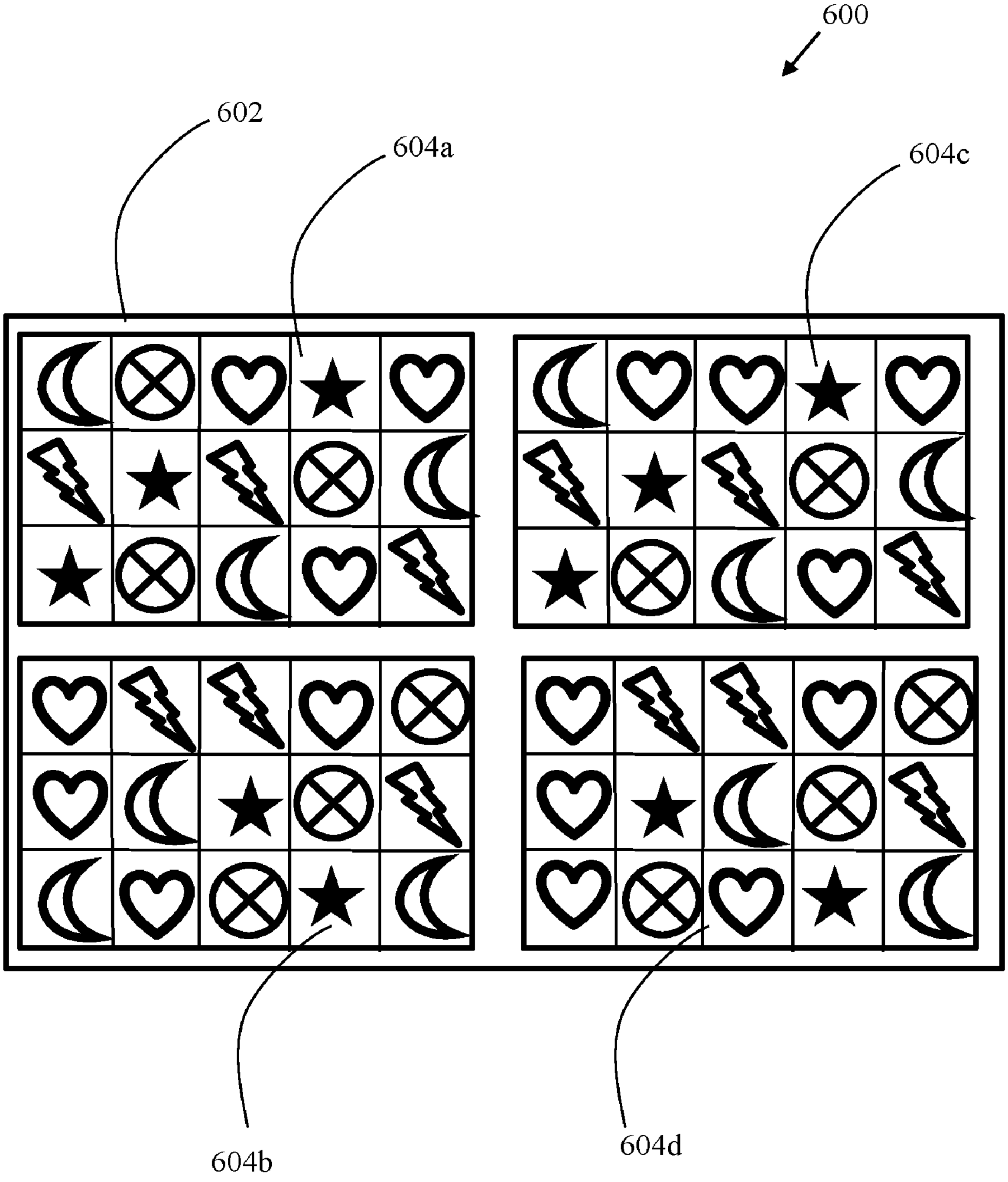

FIG. 10 illustrates an embodiment of the invention should by interface 500 in accordance with the description of the gaming system provided herein with particular respect to FIG. 4, that is, a game display 502 having multiple game outcomes therein in which wagers are received that game outcome 504*a* will be a winning outcome, game outcome 504*a* will be a non-winning game outcome, game outcome 504*b* will be a winning outcome, game outcome 504*b* will be a non-winning game outcome, game outcomes 504*a* and 504*b* will both be winning outcomes, and/or game outcomes 504*a* and 504*b* will both be non-winning game outcomes. Wagers may be placed through buttons shown in game display 502. FIG. 11 illustrates a similar embodiment in which interface 600 includes game outcomes 604*a, b, c* and *d*, respectively, each being randomly determined game outcomes shown in game display 602.

It should be appreciated that the reels may be associated with any suitable feature or features. For example, in various embodiments, one or more of the reels includes a higher concentration of high value symbols or special symbols (such as major symbols, wild symbols, and/or bonus symbols) than low value symbols or includes one or more scatter symbols that, if generated and displayed for a play of the slot game, cause the gaming system to provide a scatter award.

It should be appreciated that any suitable number of the reels may be associated with at least one game feature described herein. For instance, one embodiment, only one of the reels is associated with at least one feature. In another embodiment, a plurality of, but less than all of, the reels are each associated with at least one feature. In another embodiment, at least one of the reels is not associated with any feature. In another embodiment, at least one of the reels is associated with a plurality of different features.

In various embodiments, upon the occurrence of the game feature, the gaming system provides at least one additional free play of the slot game. It should be appreciated that the game feature may be activated by any suitable event. In one embodiment, the game feature occurs when a designated quantity of at least one special activation symbol is generated and displayed in a game outcome of the slot game or over multiple game outcomes during game play. In another embodiment, the game feature occurs when the player collects a designated quantity of special symbols in the same play of the slot game or over a plurality of different plays of the slot game.

It should be appreciated that the quantity of reels associated with the slot game, the quantity of symbol display areas; the quantity of symbol display areas with which each reel is associated, the specific winning symbol combinations, the frequency and criteria needed to be satisfied for a winning game outcome and/or any other variable or determination described herein may be predetermined, randomly determined, randomly determined based on one or more weighted percentages, determined based on a generated symbol or symbol combination, determined based on a random determination by a central controller, determined based on a random determination at an electronic gaming machine (EGM), determined based on at least one play of at least one game, determined based on a player's selection, determined based on the wager placed, determined based on an amount of coin-in accumulated, determined based on a player tracking status of the player, determined based on one or more other determinations disclosed herein, determined independent of any other determination disclosed herein; and/or determined in any other suitable manner or based on or independent of any other suitable factor(s).

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity©.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung© Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A gaming system, comprising:

at least one remote display device having an input device;

at least one processor;

and at least one memory device that stores a plurality of instructions that, when executed by the at least one processor, cause the at least one processor to operate with the at least one display device and the plurality of input devices to:

(a) establish a credit balance;

(b) initiate play of a wagering game in response to input received from the input device, the input device displaying a wager button, the wager button being associated with an amount of credit, the credit balance being decreasable by the amount of credit, the wagering game having a preset winning criteria of at least one of a game outcome in which a first symbol wins, a game outcome in which a second symbol wins, a game outcome in which no symbol wins, a game outcome in which the first and second symbol win;

(c) randomly determine and display a game outcome of an instance of play of the wagering game, wherein the game outcome includes the display of only a plurality of the first and second symbols in a depiction of virtual reels forming an array of multiple rows and multiple columns defining a plurality of cells therein; and (d) determine an award outcome based on the amount and position of each of the randomly generated first and second symbols in the cells of the array of the game outcome, the credit balance being increasable by the determined award outcome.

2. A gaming system, comprising:

a game server in communication with a remote user device through a communication network, the remote user device including a housing and a display device, the remote user device being configured to communicate remote user input to the game server through the communication network;

the game server including at least one processor in communication with a random number generator and at least one memory device that stores a plurality of instructions that, when executed by the at least one processor, cause the at least one processor to operate with the remote user device to:

(a) establish a credit balance;

(b) receive a remote user input from the remote user device through the communication network, the remote user input being determined by the game server to comprise an amount of credit, the game server being configured to initiate a wagering game responsive to the remote user input, the credit balance being decreasable by the amount of credit, the wagering game having a preset winning criteria of at least one of a game outcome in which a first symbol wins, a game outcome in which a second symbol wins, a game outcome in which no symbol wins, a game outcome in which the first and second symbol win;

(c) randomly determine and display a game outcome of an instance of play of the wagering game, wherein the game outcome includes the display of only a plurality of the first and second symbols in a depiction of virtual reels forming an array of multiple rows and multiple columns defining a plurality of cells therein; and (d) determine an award outcome based on the amount and position of each of the randomly generated first and second symbols in the cells of the array of the game outcome, the credit balance being increasable by the determined award outcome.

* * * * *